US009983772B2

(12) United States Patent
Allen et al.

(10) Patent No.: US 9,983,772 B2
(45) Date of Patent: *May 29, 2018

(54) INTELLIGENT EMBEDDED EXPERIENCE GADGET SELECTION

(71) Applicant: International Business Machines Corporation, Armonk, NY (US)

(72) Inventors: Corville O. Allen, Morrisville, NC (US); Bernadette A. Carter, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/399,262

(22) Filed: Jan. 5, 2017

(65) Prior Publication Data
US 2017/0115856 A1 Apr. 27, 2017

Related U.S. Application Data

(63) Continuation of application No. 14/494,330, filed on Sep. 23, 2014, now Pat. No. 9,588,638, which is a (Continued)

(51) Int. Cl.
G06F 17/30 (2006.01)
G06F 7/00 (2006.01)
G06F 3/0484 (2013.01)

(52) U.S. Cl.
CPC .... *G06F 3/04842* (2013.01); *G06F 17/30516* (2013.01); *G06F 17/30985* (2013.01)

(58) Field of Classification Search
USPC ......................................................... 707/736
See application file for complete search history.

(56) References Cited

U.S. PATENT DOCUMENTS

2004/0153456 A1* 8/2004 Charnock ......... G06F 17/30713
2010/0167823 A1* 7/2010 Winkler .................. G07F 17/32
463/42

(Continued)

OTHER PUBLICATIONS

IBM, Integrations, Partner, Platform; "IBM Connections 4.0 Expands Its Social, Integration, and Analytic Capabilities," Bill, Appfusions.com, Nov. 2, 2012, 4 pages.

(Continued)

*Primary Examiner* — Kuen S Lu
(74) *Attorney, Agent, or Firm* — Charles L. Moore; Moore & Van Allen PLLC

(57) ABSTRACT

A method for selecting an embedded experience gadget may include displaying an activity stream of a user on a social network, the activity stream comprising a plurality of events and detecting selection of an event from the plurality of events by the user. The method may also include determining a level of intersection between the selected event and each of a plurality of known gadgets and finding an optimal embedded experience gadget from the plurality of known gadgets based on the level of intersection between the selected event and each known gadget. The method may additionally include associating the optimal embedded experience gadget with the selected event and displaying the optimal embedded experience gadget in association with the selected event.

15 Claims, 6 Drawing Sheets

Related U.S. Application Data continuation of application No. 14/149,078, filed on Jan. 7, 2014, now Pat. No. 9,582,137.

(56) References Cited

U.S. PATENT DOCUMENTS

| | | | |
|---|---|---|---|
| 2011/0119595 A1* | 5/2011 | Bydeley | H04N 21/44213 715/738 |
| 2011/0154223 A1 | 6/2011 | Scott | |
| 2012/0072451 A1* | 3/2012 | Merrifield | A63F 13/10 707/771 |
| 2013/0174259 A1* | 7/2013 | Pearcy | H04L 41/0893 726/25 |
| 2013/0262585 A1* | 10/2013 | Niemeyer | H04L 65/60 709/204 |
| 2014/0214947 A1* | 7/2014 | Jayaram | H04L 67/306 709/204 |
| 2015/0074560 A1* | 3/2015 | Conley | G06Q 50/01 715/758 |

OTHER PUBLICATIONS

IP.com; "Method and System for Dynamically Rendering Gadgets to User in an Activity Stream Based on User Interests and Popularity of Gadgets," IPCOM000215804D, Mar. 12, 2012, 4 pages.

Wikipedia; "GUI widget," downloaded from <http://en.wikipedia.org/wiki/Widget_(computing)> on Dec. 2, 2013, pp. 1-4.

Opensocial; "Embedded Experiences," downloaded from <http://docs.opensocial.org/display/OSD/Embedded+Experiences> on Jan. 30, 2013, pp. 1-12.

Jive Software, "Jive Apps: Actions in RTE," Feb. 13, 2013, downloaded from <https: developers.jivesoftware.com/community/docs/DOC-1628> on Sep. 24, 2014, pp. 1-3.

Wikipedia; "Gadget," downloaded from <http://en.wikipedia.org/wiki/Gadget> on Nov. 1, 2013, pp. 1-3.

\* cited by examiner

INTELLIGENT EMBEDDED EXPERIENCE GADGET SELECTION

CROSS-REFERENCE TO RELATED APPLICATION

This application is a continuation of U.S. patent application Ser. No. 14/494,330, filed Sep. 23, 2014, which is a continuation of U.S. patent application Ser. No. 14/149,078, filed Jan. 7, 2014, the contents of which are hereby incorporated by reference in their entirety.

BACKGROUND

Aspects of the present invention relate to social media and networks, and more particularly to a method, system and computer program product for selecting an embedded experience gadget for a selected event in an activity stream.

Many enterprise social software products, such as IBM Connections, Jive, and similar social networking products are integrating an activity stream of a user's social networking activity and an embedded experience concept into their products. IBM and IBM Connections are trademarks of International Business Machines Corporation in the United States, other countries or both. Jive is a trademark of Jive Software, Inc. in the United States, other countries or both.

The activity stream concept is based on displaying a descending chronological list of events for any actions going on in a user's social network or notifications that may be sent to the user. Adding an embedded experience concept to the activity stream may typically be based on allowing a user to click on any of the events listed in the activity stream and displaying a pop-up that provides additional information about an object that may be the subject of the event or that may be associated with the event, as well as, optionally providing an ability to perform actions on the object or perform actions related to the object. The embedded experience concept may include an embedded experience gadget associated with the object in the event of the activity stream. The embedded experience gadget associated with the object may be based on a type of object that is the subject of the event. For example, the embedded experience gadget may be an application or computer executable code for performing actions related to items or objects such a status update, a blog, a wiki, a forum, a file, etc. The embedded experience gadget may also be determined by the system where the event occurred or by the system that created the object. For example, when a Connections status update has been created, an event is sent to the activity stream with details about the embedded experience gadget that should be used for the pop-up. When third party sources contribute events to the activity stream, they will likely reference an embedded experience gadget that they are aware of. Therefore, the embedded experience gadget selection is typically determined based on the type of object associated with the event and the user or entity creating the event or the object associated with the event. However, a contributing source to a user's activity stream may not be aware of all possible gadgets that may be available and that may be associated with an event or object in an event as an embedded experience gadget. The embedded experience gadget that is associated with the event or object of the event by an originating system may not be of any use to the user with respect to performing actions related to the object of an event. This can cause frustration and inefficiency if the user has to search for a more appropriate gadget or gadget that perform the required actions.

BRIEF SUMMARY

According to one aspect of the present invention, a method for selecting an embedded experience gadget may include displaying an activity stream of a user on a social network. The activity stream may include a plurality of events. The method may also include detecting selection of an event from the plurality of events by the user and determining a level of intersection between the selected event and each of a plurality of known gadgets. The method may additionally include finding an optimal embedded experience gadget from the plurality of known gadgets based on the level of intersection between the selected event and each known gadget. The method may further include associating the optimal embedded experience gadget with the selected event and displaying the optimal embedded experience gadget in association with the selected event.

According to an additional aspect of the present invention, a system for selecting an embedded experience gadget may include a processor and a module operable on the processor for displaying an activity stream of a user on a social network. The activity stream may include a plurality of events. The system may also include a module operable on processor for detecting selection of an event from the plurality of events by the user and a module operable on processor for determining a level of intersection between the selected event and each of a plurality of known gadgets. The system may additionally include a module operable on the processor for finding an optimal embedded experience gadget from the plurality of known gadgets based on the level of intersection between the selected event and each known gadget. The system may further include a module operable on the processor for associating the optimal embedded experience gadget with the selected event and a module operable on the processor for displaying the optimal embedded experience gadget in association with the selected event.

According to a further aspect of the present invention, a computer program product for selecting an embedded experience gadget may include a computer readable storage medium having computer readable program code embodied therewith. The computer readable program code may include computer readable program code configured to display an activity stream of a user on a social network. The activity stream may include a plurality of events. The computer readable program code may additionally include computer readable program code configured to detect selection of an event from the plurality of events by the user and computer readable program code configured to determine a level of intersection between the selected event and each of a plurality of known gadgets. The computer readable program code may also include computer readable program code configured to find an optimal embedded experience gadget from the plurality of known gadgets based on the level of intersection between the selected event and each known gadget. The computer readable program code may further include computer readable program code configured to associate the optimal embedded experience gadget with the selected event and computer readable program code configured to display the optimal embedded experience gadget in association with the selected event.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
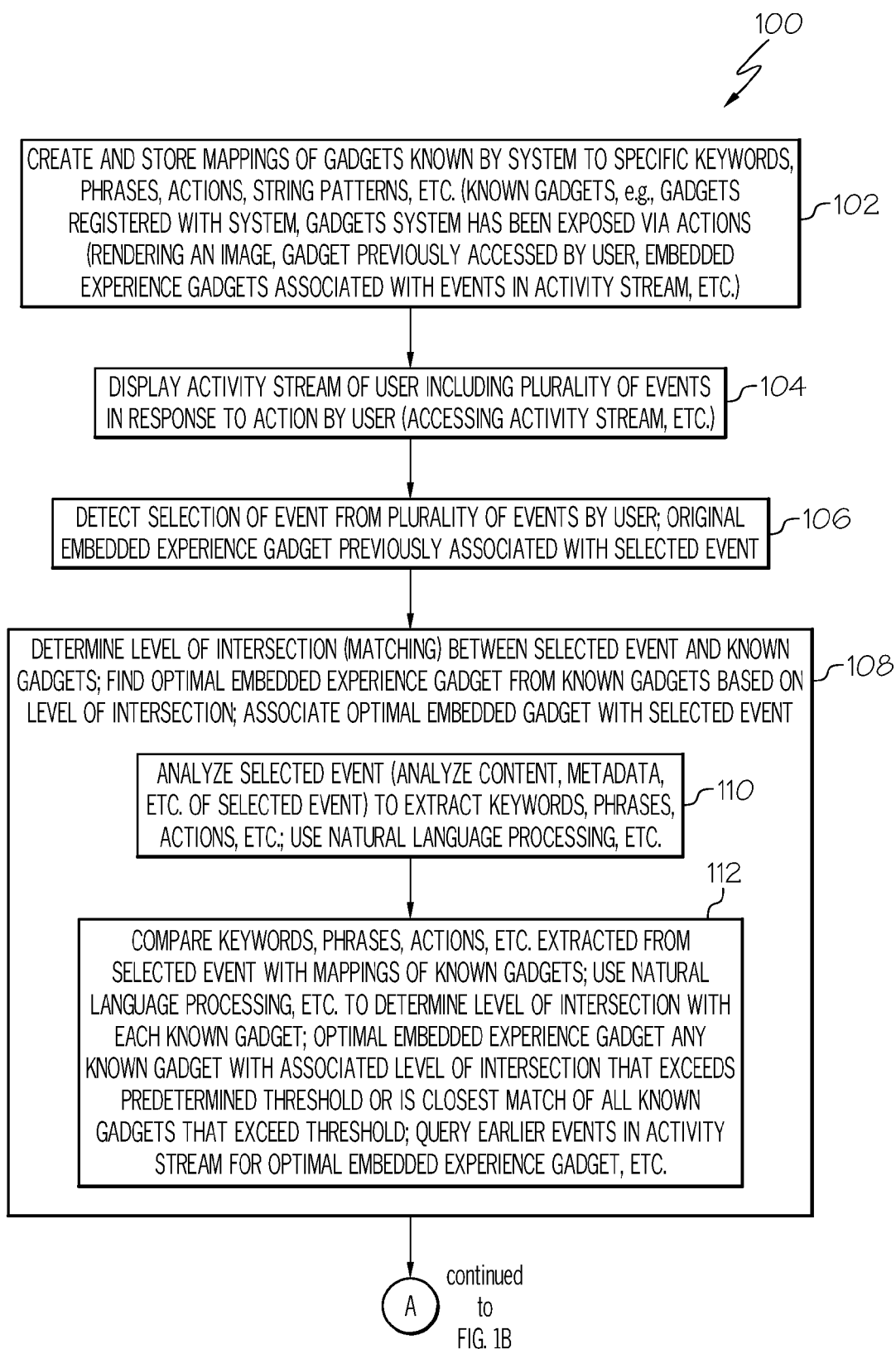
FIGS. 1A and 1B (collectively FIG. 1) are a flowchart of an example of a method for selecting an embedded experience gadget for a selected event in an activity stream in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
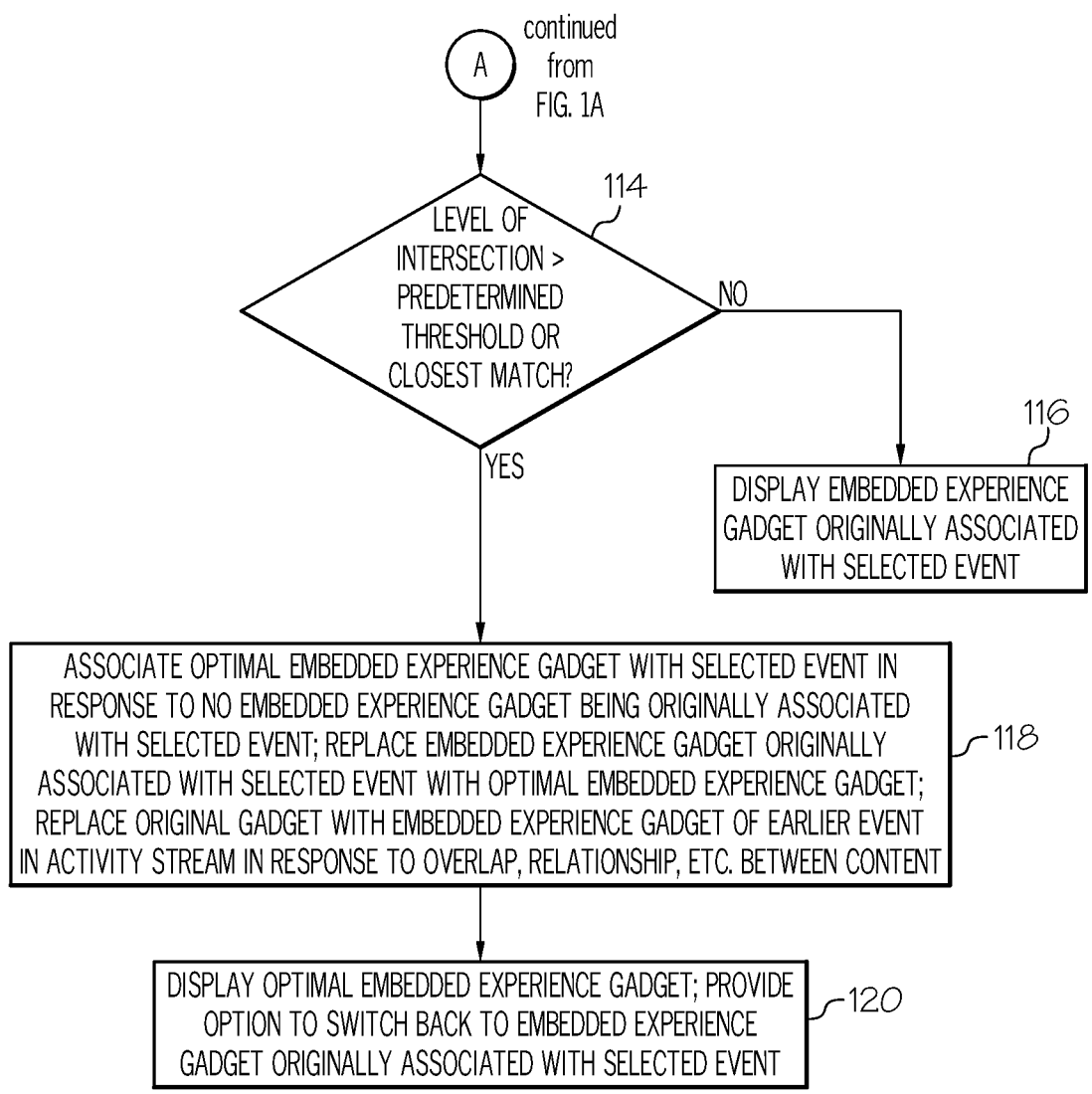

FIGS. 1A and 1B (collectively FIG. 1) are a flowchart of an example of a method 100 for selecting an embedded experience gadget for a selected event in an activity stream in accordance with an embodiment of the present invention. In block 102, mappings of gadgets known by a system to specific keywords, specific phrases, specific actions, specific string patterns or similar relationships may be created and stored. The system may be a client computer system of a user, a server, or an enterprise social software product or application or other social media that may the operating on the client computer system or the server that may be accessed by a client computer via a network, such as the Internet or private network. The gadget mappings may be stored in a memory on the client computer system, server or both or in a database that may be accessible by the client computer system, server or above. As previously discussed, a gadget may be an application or computer executable or readable code that may perform certain operations or tasks. Examples of gadgets may include but is not necessarily limited to a photo gadget for rendering images and modifying or enhancing images; a multi-media gadget that may be adapted to record and play audio or audio and video presentations; an enterprise gadget for performing particular functions related to a business; a gadget or allowing collaborative interaction between participants in a group; or other gadgets for performing specific tasks or functions. Known gadgets or gadgets known by a system may include but are not necessarily limited to gadgets which have registered with the system, gadgets the system has been exposed to via actions, such as for example, rendering an image, a gadget previously accessed or used by a user, or embedded experience gadgets associated with objects and events in an activity stream. A registered gadget or gadget that has registered with a system may include but is not necessarily limited to a widget. A widget or graphical user interface (GUI) widget may be an element or feature in a GUI that displays an information arrangement that may be changeable by a user. Examples of a widget may include but is not necessarily limited to a window or text box presented in a GUI that allows information to be entered or changed by a user, such as a widget configured to allow entering a comment, a widget configured to allow uploading a photograph, a widget configured to allow entering a vote to a poll or to enter other types of information.

Figure 2A:
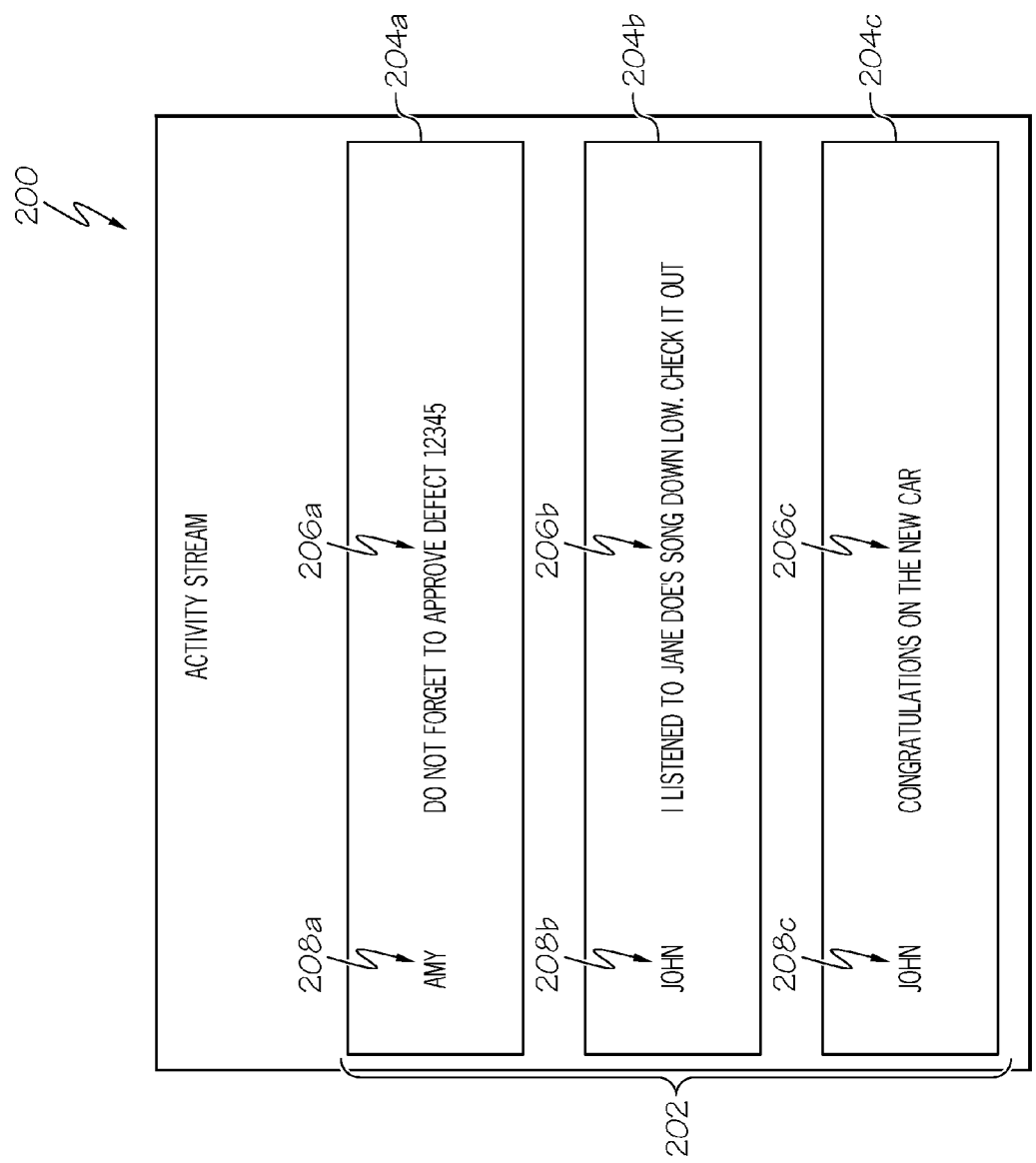
FIGS. 2A-2C illustrate an example an activity stream and intelligent selection of an embedded experience gadget in accordance with an embodiment of the present invention.
Figure 2B:
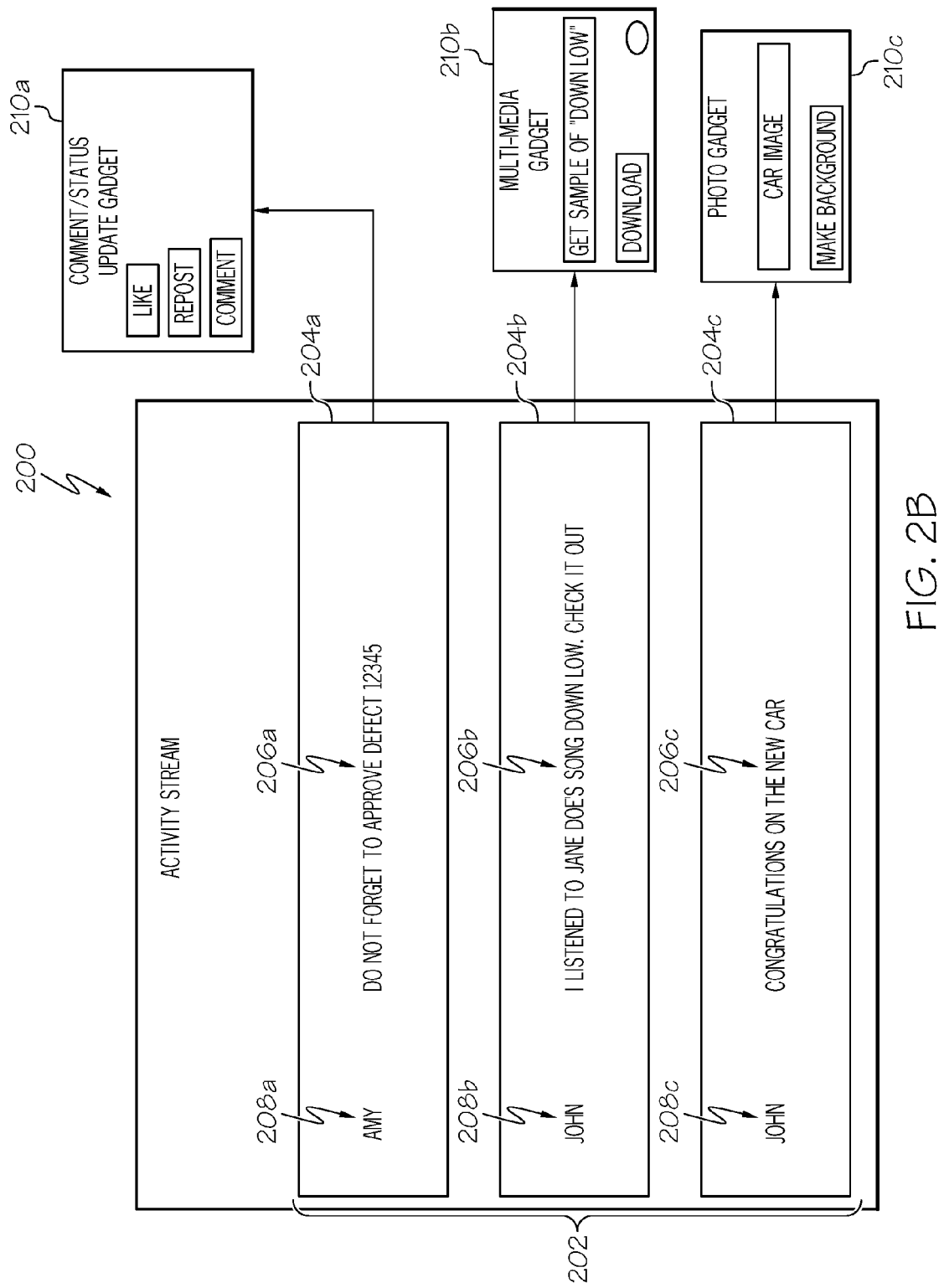
Figure 2C:
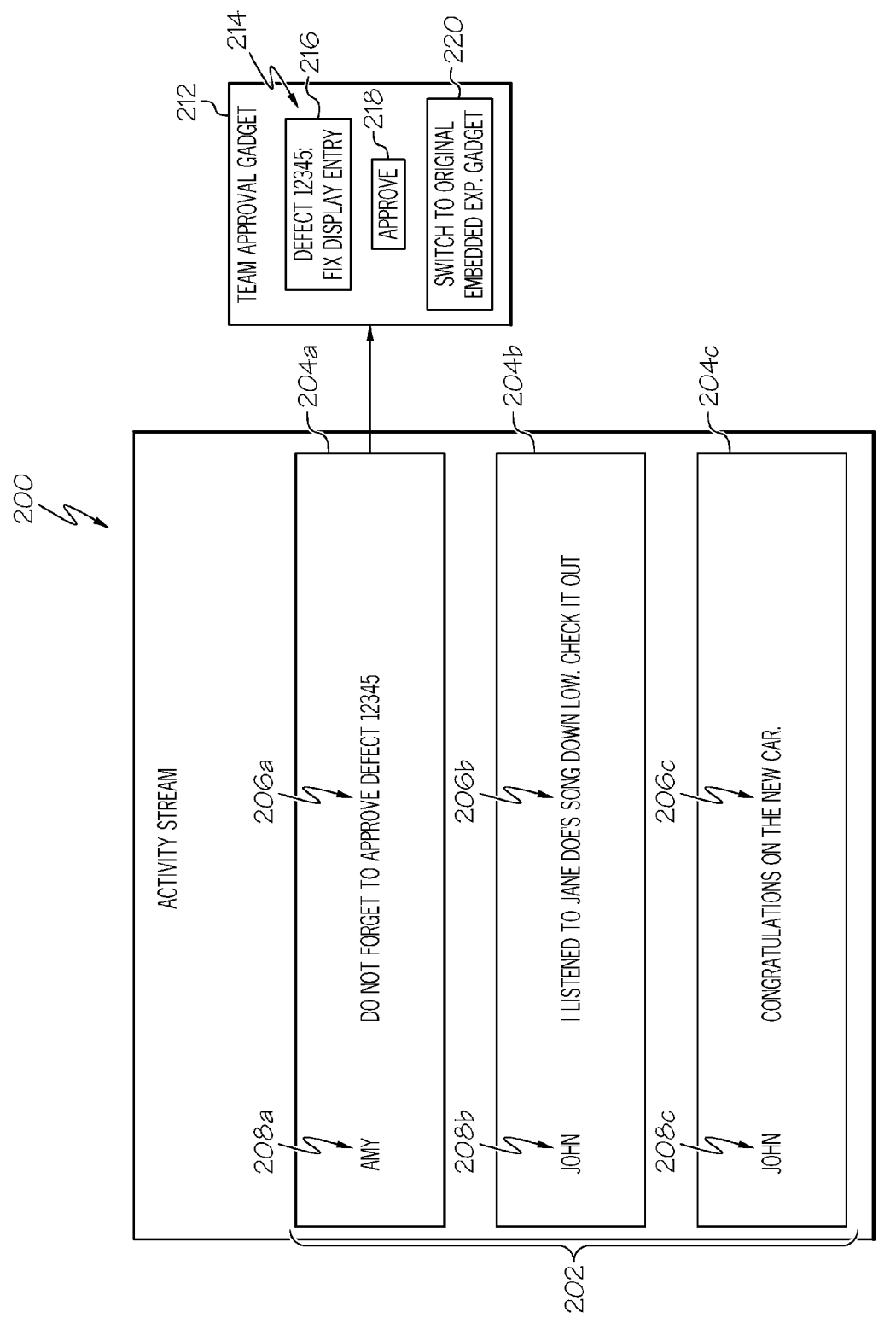

In block 104, an activity stream of a user may be displayed including a plurality of events in response to an action by the user, such as the user accessing the activity stream, opening an application that involves presenting an activity stream or some other action by the user that displays the activity stream. The activity stream may be presented or displayed on a monitor or display of the user's computer system. Referring also to FIG. 2A, FIG. 2A illustrates an example of an activity stream 200. FIGS. 2A-2C will be described along with FIGS. 1A and 1B. FIGS. 2A-2C illustrate an example an activity stream 200 and intelligent selection of an embedded experience gadget in accordance with an embodiment of the present invention. As illustrated in FIG. 2A, the activity stream 200 may include a list 202 of events that may be listed in descending chronological order according to when each particular event 204a-204c occurred or was created. Each event 204a-204c may include an object 206a-206c. The object 206a-206c may include content and other data that may be the subject of the event 204a-204c. Each event 204a-204c may also include an identity of a source or contributing source 208a-208c of the event 204a-204c. For example, the contributing sources 208a-208c illustrated in FIG. 2A display a name of a sender or source of the content 206a-206c of each event 204a-204c.

Referring also to FIG. 2B, an embedded experience gadget 210a-210c may be associated with each respective object 206a-206c of each event 204a-204c. There may also be circumstances were an event or object of an event does not have an embedded experience gadget 210a-210c associated with it. The embedded experience gadget 210a-210c may be displayed in response to the user activating or clicking on the event 204a-204c or the object 206a-206c. Otherwise, the embedded experience gadget 210a-210c may be hidden from view by the user similar to that illustrated in FIG. 1A.

As previously discussed, the particular type of embedded experience gadget 210a-210c associated with each respective object 206a-206c may be determined by the particular type or nature of the object 206a-206c, where the event was created or originated and when the event was created or originated. Accordingly, the particular embedded experience gadget 210a-210c may not be the preferred or optimal embedded experience gadget for use by the user of the activity stream 200 with respect to the object 206a-206c.

Referring back to FIG. 1A, in block 106, a selection of an event from the plurality of events of the activity stream by the user may be detected. An original embedded experience gadget may be previously associated with the selected event. For example, a particular embedded experience gadget may be associated with the object of the event when the event is created or occurs. For example, the comment/status update gadget 210a may be originally associated with the object 206a of the event 204a when the event is created or occurs.

In block 108, a level of intersection or matching between the selected event and gadgets known by the system or known gadgets may be determined. An optimal embedded experience gadget may be found from the plurality of known gadgets based on the level of intersection between the selected event and each known gadget as described in more detail herein. The optimal embedded experience gadget may be associated with the selected event.

In block 110, the level of intersection or matching between the selected event and known gadgets may include analyzing the selected event to extract keywords, phrases, actions, string patterns and/or other distinguishing features or characteristics of the event that may be used to match or determine the level of intersection or commonality between the selected event and the known gadgets. The selected event may be analyzed by analyzing the content and metadata of the object of the selected event to extract the keywords, phrases, actions, string patterns and/or other distinguishing characteristics. Natural language processing (NLP) or similar processing may be used to extract the keywords, phrases, actions, string patterns and/or other distinguishing characteristics. String patterns may refer to a set of keywords or terms that match a sequence with a regular expression. The NLP processing will perform a parts of speech analysis and anaphora resolution including identifying verbs that may lead to synonyms for action words. For example, in the exemplary activity stream in FIGS. 2A-2C in event 204b, the text "I listened to Jane Doe's song Down Low. Check it out", may be parsed by NLP to resolve to "John listens to Jane Doe's song 'Down Low'". The parsing allows for a particular matching against the action verb "listen," subject identified as song, which helps to resolve to the optimized gadget to download the song.

In block 112, at least one of the keywords, phrases, actions, string patterns or other characteristics extracted from the selected event may be compared to the mapping of each known gadget to specific keywords, specific phrases, specific actions, specific string patterns or other characteristics associated with each respective known gadget. NLP processing or other comparative technology may be used to determine the level of intersection between the selected event and each known gadget based on the comparison of the selected event to the mappings of each known gadget.

An optimal embedded experience gadget may be determined from analyzing the selected event and comparing at least one of the keyword, phrase, action, string pattern or other characteristic extracted from the selected event to the mapping of each known gadget to specific keywords, phrases, actions, string patterns or other characteristics. The optimal embedded experience gadget may be a gadget from the plurality of known gadgets with an associated level of intersection that exceeds a predetermined threshold. If there is more than one known gadget with a level of intersection that exceed the predetermined threshold, the optimal embedded gadget may be the known gadget with the highest level of intersection of all known gadgets that have a level of intersection greater than the predetermined threshold. The level of intersection may be expressed as a probability of a match between at least one of the keyword, phrase, action, string pattern or other characteristics extracted from the selected event and the mapping of the known gadgets mapped to specific keywords, phrases, actions, string patterns or other characteristic based on NLP processing. Examples of intersections or intersection points may include but is not necessarily limited to a direct match for a word or term, synonyms for words or terms, particular action verbs from NLP processing may also be an intersection point. The level of intersection or intersection point may be given a weight, for example a direct match of a term would receive a higher grade, weight or level, while a synonym match would be a lower grade, weight or level compared to a direct match. Terms processed by the NLP processing may be given a higher level of intersection or weight based on the type of gadget.

The level of intersection between the selected event and gadgets known by the system may also include a query of earlier events in the activity stream for embedded experience gadgets that may be related or share a common thread to the selected event and may provide the optimal embedded experience gadget to be associated with the object of the selected event.

In accordance with an embodiment, finding the optimal embedded experience gadget may also include analyzing third party events in the activity stream of the user based on the level of intersection between the selected event and a respective embedded experience gadget associated with each third part event in the activity stream.

In accordance with another embodiment, finding the optimal embedded experience gadget may include determining an identification of each system previously accessed by the user from activity data of the user and determining if any system previously accessed by the user includes any gadgets.

In block 114, a determination may be made if the level of intersection between the selected event and any of the known gadgets exceeds the predetermined threshold or if one of the known gadgets may be a closest match to the selected event based on the level of intersection as previously described. If the level of intersection between the selected event and the known gadgets does not exceed the predetermined threshold or if there is no closest match between the selected event and the known gadgets, the method 100 may advance to block 116. In block 116, the embedded experience gadget originally associated with the selected event may be displayed.

If the level of intersection exceeds the predetermined threshold or there is a closest match between the selected event and one of the known gadgets, the method may advance to block 118. In block 118, the optimal embedded experience gadget may be associated with the selected event in response to no embedded experience gadget having been originally associated with the selected event. If an original embedded experience gadget was previously associated with the selected event, the optimal embedded experience gadget may replace the original embedded experience gadget previously associated with the selected event or object in the selected event.

In block 118, the original gadget may be replaced with an embedded experience gadget of an earlier event and the activity stream in response to an overlap or relationship between the content of the selected event and the earlier event in the activity stream.

In block 120, the optimal embedded experience gadget may be displayed in association with the selected event in response to the user activating or clicking on the event or object associated with the event. Referring also to FIG. 2C the embedded experience gadget 210a in FIG. 2B may be replaced by the optimal embedded experience gadget 212 in FIG. 2C which has a level of intersection that exceeds the predetermined threshold and is a more appropriate embedded experience gadget for the object 206a in the example of FIGS. 2A-2C which involves of approval of a defect. In the example, keywords "approve" and "defect" may be extracted from the selected event 204a using NLP processing or similar technology. The extracted keywords may then be compared to the stored mapping of each gadget known by the system to specific keywords, actions, string patterns or other characteristics, similar to that previously described, to determine a level of intersection between the selected event and each of the plurality of known gadgets. The mapping of the gadget which becomes the optimal embedded experience gadget 212 includes similar keywords or, in the example, matching keywords "approve" and "defect." Therefore, the known gadget which becomes the optimal embedded experience gadget 212 will have a level of intersection that exceeds the predetermined threshold, or in this example, there is a 100% level of intersection or matching probability between the selected event and the optimal embedded experience gadget 212 selected from the known gadgets to replace the original embedded experience gadget 210a previously associated with the selected event 204a. The optimal embedded gadget 212 may include features 214 or mechanisms that may be more appropriate for the event or responding to the event 204a. For example, the optimal embedded gadget 212 may include features 216 for performing specific actions by the user related to the event, for example but not necessarily limited to a link to access particular data, a web site, etc., perform a predetermined function, such as approve 218 something related to the event or perform some other functions. The optimal embedded gadget may also include a feature 220 or mechanism to switch back to an original embedded gadget or to present a menu for selecting another gadget for use by the user.

Figure 3:
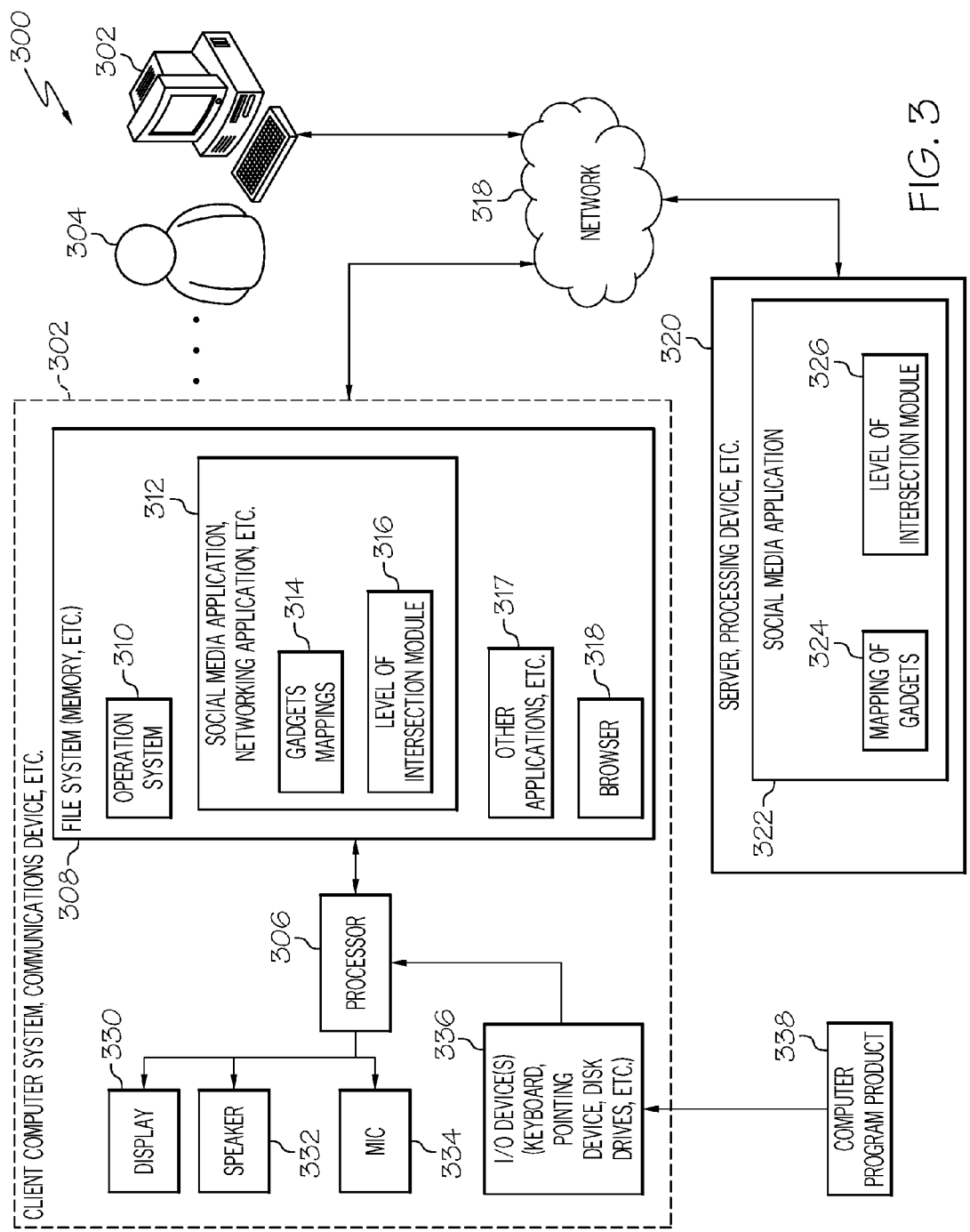
FIG. 3 is a block schematic diagram of an example of a system for selecting an embedded experience gadget in accordance with an embodiment of the present invention.

FIG. 3 is a block schematic diagram of an example of a system 300 for selecting an intelligent embedded experience gadget in accordance with an embodiment of the present invention. The method 100 described with reference to FIGS. 1A and 1B and other exemplary features described herein may be embodied in or performed by the system 300 or components of the system 300 as described below. The blocks in FIGS. 1A and 1B may be considered modules operating on the system 300 or a processor device of the system 300. The system 300 may include a client computer system 302 for use by a user. The computer system 302 may be any type of computer device capable of performing the functions or operations described herein.

The computer system 302 may include a processor 306 to control operation of the computer system 302 and a file system 308, memory or similar data storage device. An operating system 310 may be stored on the file system 308 for running or operating on the processor 306. A social media and networking application 312 or similar application configured to perform the operations and functions described herein may be stored on the file system 308 for operation on the processor 306. The social media and networking application 312 may include a file or database of gadget mappings 314. The gadget mappings may be include mappings of gadgets known to the system 300 to specific keywords, phrases, string patterns or other characteristics to which similar characteristics of a selected event may be analyzed and compared as described herein. The gadget mappings 314 may be part of the social media and networking application 312 as illustrated in FIG. 3 or may be a separate file or module from the application 312 but may operate in coordination with the application 312 to perform the functions or operations described herein.

The social media and networking application 312 may also include a level of intersection module 316. The level of intersection module 316 may determine an optimal embedded experience gadget to associate with a selected event or to replace an original embedded experience gadget as described herein. The level of intersection module 316 may be part of the social media and networking application 312 as illustrated in FIG. 3 or may be a separate file or module from the application 312 but may operate in coordination with the application 312 to perform the functions or operations described herein. The method 100 in FIGS. 1A and 1B may be embodied, at least in part, in the social media and networking application 312. The blocks of method 100 may define modules or sub-modules of the social media and networking application 314 or module.

Other applications 317, software programs or the like may also be stored on the file system 308 for operation on the processor 306. A web or Internet browser 318 may also be stored on the file system 308 for accessing one or more resources, such as a server 320 via the network 318.

In accordance with an embodiment, the server 320 or processing device may include a social media and networking application 322 for selecting an embedded experience gadget similar to that described herein. A module or file of mappings or gadgets 324 may be embodied in the social media and networking application 322 as illustrated in FIG. 3 or may be a separate module or file from the application 322 but may operate in coordination with the application 322 to perform the functions or operations described herein.

The social media and networking module or application 322 may also include a level of intersection module 326. The level of intersection module 326 may determine an optimal embedded experience gadget to associate with a selected event or to replace an original embedded experience gadget as described herein. The level of intersection module 326 may be part of the social media and networking application 322 as illustrated in FIG. 3 or may be a separate file or module from the application 322 but may operate in coordination with the application 312 to perform the functions or operations described herein. The method 100 may be embodied, at least in part, in and performed by the module or application 322 or portions of the method 100 may be performed in whole or in part by the module 312.

The computer system 302 may also include a display 330 for presenting user interfaces, graphical displays as well as other content as described herein. The computer system 302 may also include a speaker system 332 for presenting any audio content. The computer system 302 may additionally include a microphone 334 for the user 304 to aurally communicate via the computer system 302 or control the computer system 302 via voice commands.

The computer system 302 may further include one or more input devices, output devices or combination input/output devices, collectively I/O devices 336. The I/O devices 336 may include a keyboard, pointing device, such as a mouse or other computer pointing device, disk drives and any other devices to permit a user, such as user 304, to interface with and control operation of the computer system 302 and network resources, such as server 320. The application 312 and other programs 317 may be loaded on the computer system 302 from a computer program product, such as computer program product 338 using one of the input devices 336. The computer program product 338 or a similar computer program product may also be used to load the social media and networking application 322 on the server 320. The computer program product 338 may be embodied in a form similar that previously described.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for selecting an embedded experience gadget, comprising:
    displaying, by a processor, an activity stream of a user on a social network, the activity stream comprising a plurality of events;
    detecting, by the processor, selection of an event from the plurality of events by the user;
    determining, by the processor, a level of intersection between the selected event and each of a plurality of known gadgets;
    finding, by the processor, an optimal embedded experience gadget from a plurality of known gadgets based on a level of intersection between the selected event and each known gadget of the plurality of known gadgets, wherein each of the plurality of known gadgets comprises a feature that performs a specific action different from other known gadgets and the optimal embedded experience gadget comprises a feature that performs a specific action more appropriate for the selected event than other gadgets of the plurality of known gadgets; and
    associating, by the processor, the optimal embedded experience gadget with the selected event, wherein the optimal embedded experience gadget is displayed in response to the user activating the selected event associated with the optimal embedded experience gadget and the optimal embedded experience gadget is hidden from view when the selected event associated with the optimal embedded experience gadget is inactive.

2. The method of claim 1, wherein an original embedded experience gadget is previously associated with the selected event and associating the optimal embedded experience gadget with the selected event comprises replacing the original embedded experience gadget previously associated with the selected event with the optimal embedded experience gadget, the optimal embedded experience gadget being embedded in the selected event replacing the original embedded experience gadget.

3. The method of claim 2, further comprising providing an option for the user to switch back to the original embedded experience gadget previously associated with the selected event.

4. The method of claim 1, further comprising creating a mapping of each of the plurality of known gadgets to specific keywords, specific actions and specific string patterns related to respective ones of the plurality of known gadgets.

5. The method of claim 4, wherein determining the level of intersection between the selected event and each of the plurality of known gadgets comprises:
    analyzing the selected event to extract at least one of a keyword, a phrase, an action, and a string pattern from the event; and
    comparing the at least one of the keyword, the phrase, the action and the string pattern extracted from the selected event to the mapping of each known gadget to specific keywords, specific phrases, specific actions and specific string patterns.

6. The method of claim 5, further comprising using natural language processing to analyze the selected event to extract the at least one of the keyword, the phrase, the action, and parts of speech from a content of the selected event and to compare the one of the keyword, the phrase, the action and the string pattern extracted from the selected event to the mapping of each known gadget to specific keywords, specific phrases, specific actions and specific string patterns.

7. The method of claim 5, wherein the optimal embedded experience gadget is a gadget from the plurality of known gadgets with an associated level of intersection that exceeds a predetermined threshold, or a gadget of all known gadgets with a highest level of intersection greater than the predetermined threshold, or with a highest probability of matching the at least one of the keyword, the phrase, the action, and the string pattern extracted from the selected event.

8. The method of claim 1, wherein determining the level of intersection between the selected event and each of the plurality of known gadgets comprises querying earlier events in the activity stream for the optimal embedded experience gadget.

9. The method of claim 1, wherein the plurality of known gadgets comprises at least one of a gadget stored in a registry of a computer system, gadgets previously used or accessed by the user, and embedded experience gadgets associated with other events in the activity stream.

10. The method of claim 1, wherein determining the level of intersection between the selected event and each of the plurality of know gadgets comprises:
    extracting at least one of a keyword, a phrase, an action, and a string pattern from at least one of content and metadata of the selected event; and
    comparing the at least one of the keyword, the phrase, the action, and the string pattern extracted from the selected event to a mapping of each known gadget to specific keywords, specific phrases, specific actions and specific string patterns related to respective ones of the plurality of known gadgets.

11. The method of claim 10, wherein comparing the at least one of the keyword, the phrase, the action and the string pattern extracted from the selected event to the mapping of each known gadget comprises:
    determining an identification of each system previously accessed by the user from activity data of the user; and
    determining if any system previously accessed by the user includes a gadget.

12. The method of claim 1, wherein finding the optimal embedded experience gadget comprises analyzing third party events in the activity stream of the user based on the level of intersection between the selected event and a respective embedded experience gadget associated with each third party event.

13. The method of claim 1, wherein the plurality of events are listed in the activity stream in chronological order according to when each particular event occurred or was created.

14. The method of claim 1, wherein each event comprises an object and an identity of a source of each event, the object of each event comprising content.

15. The method of claim 1, wherein displaying the activity stream comprises displaying for each event the content of each event and a name of a sender or source of the content of each event.

* * * * *